(12) United States Patent
Zimmermann et al.

(10) Patent No.: US 8,865,370 B2
(45) Date of Patent: Oct. 21, 2014

(54) ENERGY STORAGE INTEGRATED FRAMEWORK FOR PORTABLE ELECTRONIC DEVICES

(75) Inventors: Joerg Zimmermann, Vancouver (CA); Gerard F McLean, West Vancouver (CA)

(73) Assignee: Societe BIC, Clichy (FR)

( * ) Notice: Subject to any disclaimer, the term of this patent is extended or adjusted under 35 U.S.C. 154(b) by 1049 days.

(21) Appl. No.: 12/536,367

(22) Filed: Aug. 5, 2009

(65) Prior Publication Data

US 2010/0035102 A1  Feb. 11, 2010

Related U.S. Application Data

(60) Provisional application No. 61/086,394, filed on Aug. 5, 2008.

(51) Int. Cl.
*H01M 8/04* (2006.01)
*H01M 8/24* (2006.01)

(52) U.S. Cl.
CPC ............ *H01M 8/04201* (2013.01); *H01M 8/04* (2013.01); *H01M 8/04007* (2013.01); *H01M 8/2465* (2013.01); *H01M 8/2475* (2013.01); *H01M 8/249* (2013.01); *H01M 2250/30* (2013.01); *Y02B 90/18* (2013.01); *Y02E 60/50* (2013.01)
USPC .......................................................... 429/515

(58) Field of Classification Search
CPC .................................................... H01M 8/04216
USPC ................................................... 429/400–535
See application file for complete search history.

(56) References Cited

U.S. PATENT DOCUMENTS

| | | | |
|---|---|---|---|
| 6,095,367 A | 8/2000 | Blair et al. | |
| 6,676,159 B1 * | 1/2004 | Sellergren | ...... 280/783 |
| 7,117,732 B2 | 10/2006 | Curello | |
| 7,117,906 B2 | 10/2006 | Adams | |
| 7,118,825 B2 | 10/2006 | Rastegar et al. | |
| 7,642,742 B2 | 1/2010 | Curello | |
| 7,655,331 B2 | 2/2010 | Adams | |
| 2002/0092229 A1 | 7/2002 | Rogers et al. | |
| 2006/0088751 A1 | 4/2006 | Stefener et al. | |
| 2006/0172173 A1 * | 8/2006 | Misawa | ...... 429/34 |
| 2006/0237688 A1 * | 10/2006 | Zimmermann | ...... 252/184 |
| 2007/0295617 A1 | 12/2007 | Zimmermann | |

* cited by examiner

*Primary Examiner* — Jonathan G Leong
(74) *Attorney, Agent, or Firm* — The H.T. Than Law Group

(57) ABSTRACT

Embodiments of the invention relate to a fuel cell system for a portable electronic device including one or more fuel storage components, adapted to store and deliver a fuel, one or more electronic components and one or more fuel cells in contact with at least one of the one or more fuel storage components and one or more electronic components. The one or more fuel storage components are adapted to provide a secondary function, in addition to storing and delivering fuel.

18 Claims, 3 Drawing Sheets ical application claims the benefit of pri-
ENERGY STORAGE INTEGRATED FRAMEWORK FOR PORTABLE ELECTRONIC DEVICES

PRIORITY OF INVENTION

This non-provisional application claims the benefit of priority under 35 U.S.C. §119(e) to U.S. Provisional Patent Application Ser. No. 61/086,394, filed Aug. 5, 2008, which is herein incorporated by reference.

BACKGROUND

Many portable electronic devices integrate a structural framework within the device to protect and support functional components of a device. Device framework designs typically function exclusively as structural elements for the device, providing housing, covering and internal features that support and segregate specific functional components within the device. For example, mobile devices currently include robust frameworks that are dedicated to protecting the electronic components of the device and providing cavities for modular components, such as batteries, circuit boards, displays etc. As the need for power and energy within portable electronic devices continues to increase, future devices will need to incorporate aspects of fuel cell systems including fuel cells, fuel storage and control elements within and around the devices structural framework. Portable electronic components also provide thermal support or functions, electrical support and magnetic functions, in addition to structural support. Each component is most often associated with its primary function and is not adapted or capable of providing a secondary function.

Existing device components function as structural members yet offer no additional functionality, which consumes space that could otherwise be available for functional components. For example, battery-powered devices require sufficient support to protect the battery packs from external forces that may compromise safety of users. Future systems using fuel cell technology will require the support and protection of multiple different components including fuel cells, fuel storage, vents, fluidic controls and power conditioning electronics. Employing current structural designs would typically involve packaging all fuel cell components into a single cavity within the structural framework of the device. This may be space inefficient, and may also unnecessarily constrain the functionality of the fuel cell power source. Additionally, many components within a portable device solely serve a thermal support or electro-magnetic support purpose and do not serve additional functions. Without integrating multiple functions into single components, efficiency, small size and power gains are difficult to attain and limited by each component.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

SUMMARY

Figure 1A:
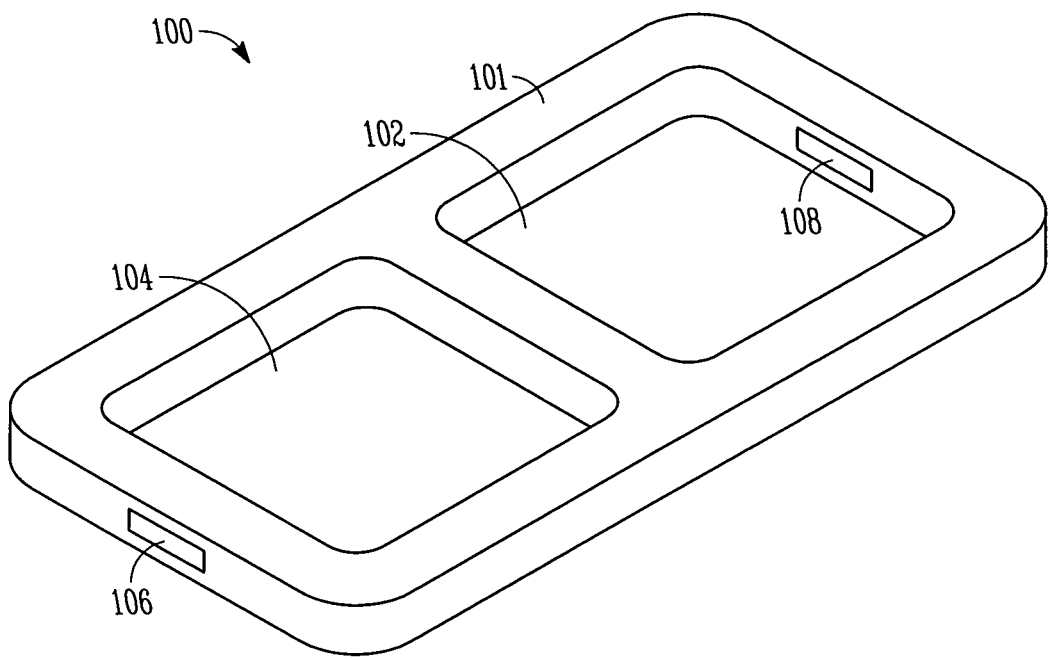
FIGS. 1A-B illustrate a perspective view of a fuel storage component conforming to a portion of a portable electronic device, according to some embodiments

Embodiments of the invention relate to a fuel cell system for a portable electronic device including one or more fuel storage components, adapted to store and deliver a fuel, one or more electronic components and one or more fuel cells in contact with at least one of the one or more fuel storage components and one or more electronic components. The one or more fuel storage components is adapted to provide a secondary function, in addition to storing and delivering fuel.

Embodiments also relate to a fuel cell system for a portable electronic device including one or more composite hydrogen fuel storage components adapted to store and deliver a fuel, one or more electronic components, one or more power generating components and one or more fuel cells in contact with at least one of the one or more fuel storage components, one or more electronic components and one or more power generating components. The one or more composite hydrogen fuel storage components are adapted to further provide structural support to the device.

Embodiments also describe a hydrogen-containing fuel storage component for use in a fuel cell-powered portable electronic device including a composite hydrogen fuel storage component and one or more features. The one or more features are adapted to provide an interaction between the fuel storage component and one or more non-fuel storage components within a portable electronic device.

Embodiments relate to a method of using a fuel storage component including contacting one or more fuel storage components with a fuel and releasing the fuel to one or more fuel cells, in contact with at least one of the one or more fuel storage components. The one or more fuel storage components are adapted to provide a secondary function, in addition to contacting and releasing a fuel.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

In this document, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Embodiments of the invention relate to a fuel store or fuel storage component providing a secondary function for a portable electronic device, in addition to storing and delivering fuel. Embodiments of the invention utilize properties of certain energy storage components, such as toughness, rigidity, and mechanical strength to provide structural functions. The fuel store or storage component may also include a secondary function such as thermal support, electro-magnetic support or some combination thereof. Certain energy storage components are also capable of being conformed to the form factors of components within a device so as to make use of wasted space. In doing this, reliance on structural components that otherwise provide no additional function may be reduced while maintaining structural integrity. This ultimately may reduce the overall footprint of the device and increases its energy density.

Definitions

As used herein, "portable electronic device" may refer to a device that requires a supply of power to operate power-consuming components of the device. Examples of portable electronic devices include cellular phones, satellite phones, personal digital assistants (PDAs), global positioning systems (GPS), 2-way radios, handheld point-of-sale (POS) terminals, ultra mobile personal computers (UMPCs), laptop computers, mobile internet devices, computer accessories, displays, personal audio or video players, medical devices, televisions, transmitters, receivers, radio frequency identifiers (RFIDs), lighting devices, electronic toys, cameras, radios, or scanners.

As used herein, "energy storage component" refers to a component that is capable of storing some form of energy that can be drawn upon at a later time to perform some useful operation. Examples of energy storage components include fuel stores, capacitors, ultracapacitors, and batteries.

As used herein, "fuel store" or "fuel storage component" refers to a component that is capable of storing and delivering fuel for use in an energy conversion device. Fuel stores may include fuel-storing structures and fuel-storing materials. Examples of fuel-storing structures include fuel containment devices and fluid enclosures. Fuel-storing materials may be contained within fuel-storing structures; however, certain fuel-storing materials, such as structural fuel-storing materials, may be capable of storing fuel absent such fuel-storing structures. Examples of structural fuel-storing materials include active material particles and hydrogen-storing materials. Certain fuel stores may include reactant stores that provide fuel to one or more electrochemical cells, as described below.

As used herein, "functional component" refers to a component or part of a portable electronic device that contributes to the operation of the device, in a way other than solely structural. A functional component may include a structural function, but also include functionality for energy storage, energy conversion, user control, heat management, etc. Examples of functional components include electrochemical cells, parts of electrochemical cells, fluidic communication components, user interface controls, electronic communication components, such as circuit boards, etc. Electronic components and power generating components may be examples of functional components. Electronic components may include circuits, displays, electrical controls, capacitors, circuit boards, inductors, displays, display backlights, processors, applications processors, power amplifiers, wireless transceivers, linear regulators, switching power converters, graphics processors, baseband processors, processor memory, communications processors, magnetic storage, GPS receivers, microcontrollers, or a combination thereof. Power generating components may include auxiliary fuel cells, batteries or a combination thereof, or other components which may convert stored energy to usable power in the form of electricity.

As used herein, "fluid" refers to a continuous, amorphous substance whose molecules move freely past one another and that has the tendency to assume the shape of its container. A fluid may be a gas, liquefied gas, liquid or liquid under pressure. Examples of fluids may include fluid reactants, fuels, oxidants, and heat transfer fluids. Fluid fuels used in fuel cells may include hydrogen gas or liquid and hydrogen carriers in any suitable fluid form. Examples of fluids include air, oxygen, water, hydrogen, alcohols such as methanol and ethanol, butane, borohydride compounds such as sodium and potassium borohydrides, and formic acid.

As used herein, "fluid enclosure" may refer to a device for storing a fluid. The fluid enclosure may store a fluid physically or chemically. For example, the fluid enclosure may chemically store a fluid in active material particles. A fluid enclosure may also refer to a fluid enclosure including active material particles and an outer enclosure wall, conformably coupled to the fluid storage component and may also include structural fillers. Examples of such fluid enclosures are found in commonly-owned U.S. Pat. No. 7,563,305, whose disclosure is incorporated by reference herein in its entirety. A fluid enclosure may contain a fluid storage component contained within the enclosure in a variety of ways, for example, the fluid enclosure may include an internal structure, such as a cellular reservoir. Examples of such fluid enclosures may be found in commonly-owned U.S. patent application Ser. No. 11/621,501, filed Jan. 9, 2007, whose disclosure is incorporated by reference herein in its entirety.

As used herein, "active material particles" refer to material particles capable of storing hydrogen or other fluids or to material particles that may occlude and desorb hydrogen or another fluid. Active material particles may include fluid-storing materials that occlude fluid, such as hydrogen, by chemisorption, physisorption or a combination thereof. Some hydrogen-storing materials desorb hydrogen in response to stimuli, such as change in temperature, change in heat or a change in pressure. Examples of hydrogen-storing materials that release hydrogen in response to stimuli, include metal hydrides, chemical hydrides, suitable micro-ceramics, nano-ceramics, boron nitride nanotubes, metal organic frameworks, palladium-containing materials, zeolites, silicas, aluminas, graphite, and carbon-based reversible fluid-storing materials such as suitable carbon nanotubes, carbon fibers, carbon aerogels, and activated carbon, nano-structured carbons or any combination thereof. The particles may also include a metal, a metal alloy, a metal compound capable of forming a metal hydride when in contact with hydrogen, alloys thereof or combinations thereof. The active material particles may include magnesium, lithium, aluminum, calcium, boron, carbon, silicon, transition metals, lanthanides, intermetallic compounds, solid solutions thereof, or combinations thereof. The active material particles may be formed into a composite hydrogen storage material. Examples of such materials can be found in commonly-owned U.S. patent application Ser. No. 11/379,970, filed Apr. 24, 2006, and commonly-owned U.S. patent application Ser. No. 12/052, 848, both of whose disclosures are incorporated by reference herein in their entirety.

As used herein, "occlude" or "occluding" or "occlusion" refers to absorbing or adsorbing and retaining a substance, such as a fluid. Hydrogen may be a fluid occluded, for example. The fluid may be occluded chemically or physically, such as by chemisorption or physisorption, for example. As used herein, "desorb" or "desorbing" or "desorption" refers to the removal of an absorbed or adsorbed substance. Hydrogen may be removed from active material particles, for example. The hydrogen or other fluid may be bound physically or chemically, for example.

As used herein, "contacting" refers to physically, chemically, electrically touching or within sufficiently close proximity. A fluid may contact an enclosure, in which the fluid is physically forced inside the enclosure, for example.

As used herein, "electrochemical cell" refers to a device that converts chemical energy to electrical energy or converts electrical energy to chemical energy. Examples of electrochemical cells may include galvanic cells, electrolytic cells, electrolyzers, fuel cells, batteries and metal-air cells, such as zinc air fuel cells or batteries. Any suitable type of electrochemical cell including fuel cells and appropriate materials can be used according to the present invention including without limitation proton exchange membrane fuel cells (PEMFCs), solid oxide fuel cells (SOFCs), molten carbonate fuel cell (MCFCs), alkaline fuel cells, other suitable fuel cells, and materials thereof. Further examples of fuel cells include proton exchange membrane fuel cells, direct methanol fuel cells, alkaline fuel cells, phosphoric acid fuel cells, molten carbonate fuel cells or solid oxide fuel cells.

As used herein, "feature" refers to a component associated with a fluid enclosure. A feature may be a fluidic feature or a structural feature. A fluidic feature may act to communicate between an enclosure and an external device or ambient environment, to observe or control a fluid, or act as a structural component. Examples of a fluidic feature may include a valve, regulator, pressure relief device, flow element, cap, fitting, vent, strain-relieving device, etc.

As used herein, "structural feature" or "structural component" refers to an element that may be associated with the shape, positioning or alignment of the structural filler, the outer enclosure wall or the overall fluid enclosure. A structural feature may be formed to allow space for external components or to create more efficient alignment between the fluid enclosure and an external device, for example. Structural features include convex protrusions, concave recesses, mountings, flanges, fittings, bosses, smoothed or radiused corners, etc. A structural feature may be an example of a feature, as described above.

When the fuel being stored in the fuel store is hydrogen, a composite hydrogen storage material may be used as the fuel storage component and has potential to serve as a structural, thermal or electro-magnetic component to support other functional components within the device. Examples of such material can be found in commonly-owned U.S. patent application Ser. No. 11/379,970, filed Apr. 24, 2006, which is incorporated by reference. The polymer bound composite is coated with a polymer shell to prevent leakage of fuel, as exemplified in commonly-owned U.S. patent application Ser. No. 11/473,591, filed Jun. 23, 2006, whose disclosure is incorporated by reference herein in its entirety. These polymer bound composites are tough and provide significant structural strength, which allow for its structural functionality, and also serves as a hydrogen store. An attribute of such polymer bound composite storage devices is that the overall form factor of the resultant fuel store can be specified largely independently of any constraints imposed by the material being stored. The polymer bound composite can be made in a variety of shapes including irregular shapes and thin planar shapes. These properties allow polymer bound composites to function as a structural component for a portable electronic device. Therefore a polymer shell coating a polymer bound composite of metal hydride has the ability to create a substantially rigid substrate onto which components and exterior covers can be attached, as well as being able to have cavities formed in it into which components can be placed.

It is possible to connect multiple energy storage components in a single system with the use of fluid interconnections between the individual components. Examples of such interconnections may be found in commonly-owned U.S. patent application Ser. No. 12/053,374, filed Mar. 21, 2008, whose disclosure is incorporated by reference herein in its entirety and are suitable for use as fluid interconnections between individual components. Taking this approach, multiple cavities within a portable electronic device can be fitted with energy storage components, and some aspects of the structural framework for the device may be replaced or integrated with other energy storage components. The polymer composite can be net-formed to conform to a particular shape, so as to fit within a specified form.

In one example, a housing or enclosure of a portable electronic device may be somewhat over-sized relative to the components it contains because the components are mounted on one or more circuit boards within the device. The circuit boards are mostly planar and rectangular, whereas the components protrude from these planar forms in irregular ways, creating opportunities for energy storage components that are conformed to fit between the populated circuit boards and the device housing. Either a single energy storage component molded to the desired shape, or multiple or possibly irregular shaped energy storage components can be designed to provide energy storage for such a device. In some cases, aspects of the structural framework that form the device housing can be built from the energy storage component. When an energy storage component is used to replace a structural framework some means of enclosing device components or attaching device components to the structural framework may be utilized. Features such as mounting bosses, device attachments or other means of attachment can be directly molded onto the polymer shell so as to provide a means of using the polymer composite energy storage components as a structural support for other components. Devices, such as fluidic controllers, fluid manifolds, and charging ports, for example such as those found in commonly-owned U.S. patent applications Ser. Nos. 11/936,662; 12/053,366; and 12/053,374, filed Nov. 7, 2007, Mar. 21, 2008 and Mar. 21, 2008 respectively, whose disclosures are incorporated by reference herein in their entirety, are examples of devices suitable for attachment to the energy storage component. This has potential to allow structural-only components to be eliminated from the device design, being replaced with energy storage components and resulting in a portable electronic device with an overall higher proportion of energy storage relative to the weight and volume of the device than could be achieved without the use of the energy storage as a structural member. Devices, such as state of charge indicators found in commonly-owned U.S. patent application Ser. No. 12/144,619, filed Jun. 23, 2008 and U.S. patent application Ser. No. 11/644,999, filed Dec. 22, 2006, whose disclosures are incorporated by reference herein in their entirety, are examples of devices which may also be suitable for attachment to the energy storage component.

In some fuel stores built from composite hydrogen storage materials, the fuel store is known to undergo significant dimensional change as the state of charge of the fuel store changes. When such technology is used, it becomes necessary to employ some sort of strain relief mechanism between features on the fuel store and components being attached or contained by those features. In some cases simple compliant grommets provide adequate strain relief. In more complex fixturing examples, strain relieving technology suitable for coupling components of the device suitable to energy storage components may be found in commonly-owned U.S. patent application Ser. No. 12/052,829, filed Mar. 21, 2008, whose disclosure is incorporated by reference herein in its entirety. Embodiments that use flexible fluid enclosures or fluid enclosures that strain benefit in particular from use of a strain-relieving interface. Examples of fluid enclosures that are flexible and fluid enclosures that change dimension in response to being filled with fluid and releasing fluid are described in the above-referenced U.S. patent application Ser. No. 11/473, 591. The strain-relieving interface may be used with any energy storage component in accord with the invention described in this application.

In a further example, the energy storage component may be formed as a replacement for a structural or non-structural circuit board used to mount application components. The energy storage component may be formed as a flat surface or surfaces otherwise suitable for forming or attaching an electrical circuit onto which circuit components can be directly mounted. It is possible to place electrically conductive traces directly on the surface of the energy storage enclosure to provide a means of interconnection between electronic components, sub-assemblies etc.

In another example, the energy storage component may form an overall structural frame onto and into which other components are supported and inserted. In this example the energy storage component at least in part replaces the function of a 'chassis,' which would normally be used. By using the fuel store as a structural chassis it becomes possible to lower the cost and complexity of other components in the system. For example, a large circuit board is required to maintain a degree of rigidity so that components and traces do not fail due to fatigue and other flexing. By mounting the Circuit board to a structural fuel store, the fuel store can provide the necessary rigidity thus allowing a thinner or otherwise lower cost circuit board to be used. Overall the mechanical strength of the device is retained or enhanced while the number and complexity of individual components is reduced.

In addition to the use of energy storage components to enclose or support components (partially or fully) within a device or form an overall external structure, there are other functions which a structural hydrogen storage device can serve. These alternative functions relate to the thermal, electronic and magnetic properties of the structural hydrogen storage materials, in which the hydrogen storage materials serve a dual or triple function within the device. Secondary functions may include thermal, electronic, magnetic or some combination of functions. Thermal support may include dissipating heat, directing heat, absorbing heat, recycling heat or reflecting heat. Electro-magnetic support may include conducting a current, insulating a current, generating a magnetic field or directing a magnetic field.

Some energy storage devices that store hydrogen carriers may exhibit certain thermal characteristics, and in particular those based on metal hydrides have the characteristic of absorbing heat when discharging fuel. As such, locating these in proximity to other heat generating components within the portable electronic device may offer thermal management benefits. If an energy storage component were to be used in this context, then the net-shape forming characteristic would be advantageous by allowing the heat absorbing or rejecting surfaces to be conformed to shapes that are either optimally matched to the heat generating components to maximize heat transfer, or optimally shaped for heat rejection. Thus, while the overall idea of exploiting thermal synergies has been developed, the use of the shape modification potential for the hydrogen storage provides new utility. The modification of the energy storage component to enhance its heat transfer capabilities may be additionally desirable in these applications. Thus, the one or more energy storage components may be manufactured of various compositions and materials to provide custom or desired thermal and electrical properties. The energy storage components may be substantially or partially electrically conductive, electrically insular, thermally conductive, thermally insular or some combination thereof.

Similarly, the electrical properties (resistance, capacitance, inductance, etc.) of an energy storage component, such as a hydrogen storage material, may be modified and the shapes adjusted to create desirable properties that may allow portions of energy storage component to serve double duty as passive electronic components. Similarly, by choosing materials carefully and selecting the shape of the energy storage component appropriately these may have potential to serve as radio frequency (RF) components such as waveguides and antennas, or to otherwise affect the RF properties of the portable electronic device.

In the previous two examples, utility beyond simple energy storage is achieved by coupling the ability to tailor both the shape and the basic composition of the storage materials in order to satisfy a function other than simply storing energy. In addition, modification along these lines does not preclude the use of the storage as a structural element, allowing the potential for in some cases a triple-function material.

One or more fuel storage components may be part of a larger fuel cell system. One or more electronic components and one or more optional power generating components may be included in the system. One or more fuel cells may be in contact with at least one of the fuel storage components, electronic components or optional power generating components. The fuel storage components may include a plurality of fuel stores in fluidic communication so as to define one or more cavities, for example. The fuel storage components may include protrusions or recesses to provide a mechanical engagement between the one or more fuel storage components and any electronic components. The fuel storage components may be non-planar and irregularly shaped. Recesses or protrusions are examples of features that may be included on the fuel storage components. One or more features may be adapted to provide an interaction between the fuel storage component and one or more non-fuel storage components within a device. Non-storage components may refer to the previously mentioned electrical or electronic components, structural components or power generating components. The interaction may be physical, electrical, magnetic, thermal or a fluidic interaction, for example.

FIG. 1A illustrates a perspective view of a perspective view of a fuel storage component conforming to a frame 100 or a housing of portion of a portable electronic device, according to some embodiments. A device frame incorporates a fluidic interface 106 that allows fuel to be transferred into the volume defined by fuel store 101, such as a structural fuel storage component. An optional second fluidic interface 108 is also illustrated. In this case, the device allows fuel to be drawn out of the fuel store from a different location than it is placed into the fuel store, additional fluidic interfaces could be incorporated into the system. Cavity 102 defines a partial recess in the frame 100 into which a component may be placed. Through hole or cavity 104 may define a large opening in the frame that also allows for the placement of components. Designs may incorporate multiple cavities and through holes as required to conformally define the shape of the structural frame. The cavity, hole or other feature may at least partially enclose at least one electronic component, for example.

Figure 1B:
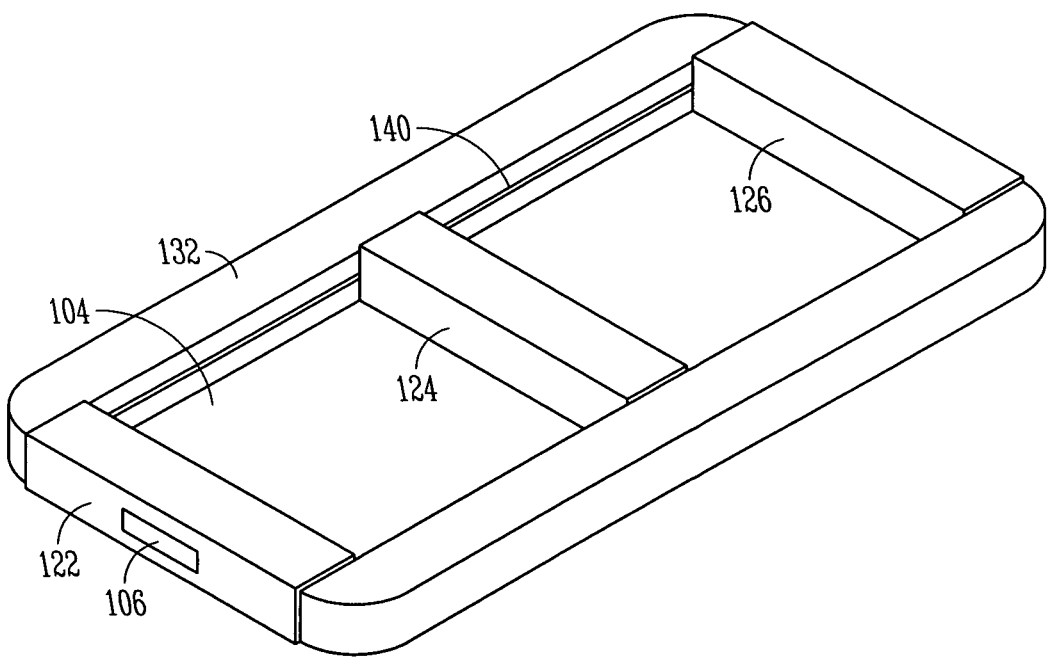

FIG. 1B shows an alternative configuration of a structural frame 120 in which multiple fuel stores 122, 124, 126 are bonded to purely structural elements 130, 132. As in the previous example a fluidic interface 106 is included but now the independent fuel stores 122, 124, 126 are coupled to each other with fluidic coupling 140. Also as in the previous example the structural frame defines cavities 104 into which components can be placed.

Note that alternative methods of attaching components to fuel stores may be employed, such as molding standoffs directly onto the surface of the fuel store, forming slots in openings in the fuel store to allow components to slide into place, forming cavities in the fuel store to allow components to be placed internally. In some simple configurations components can be directly bonded to the fuel store, although care must be taken in the case where fuel stores are not dimensionally stable to ensure the bond interface can accommodate differential strains between fuel stores and components.

Figure 2:
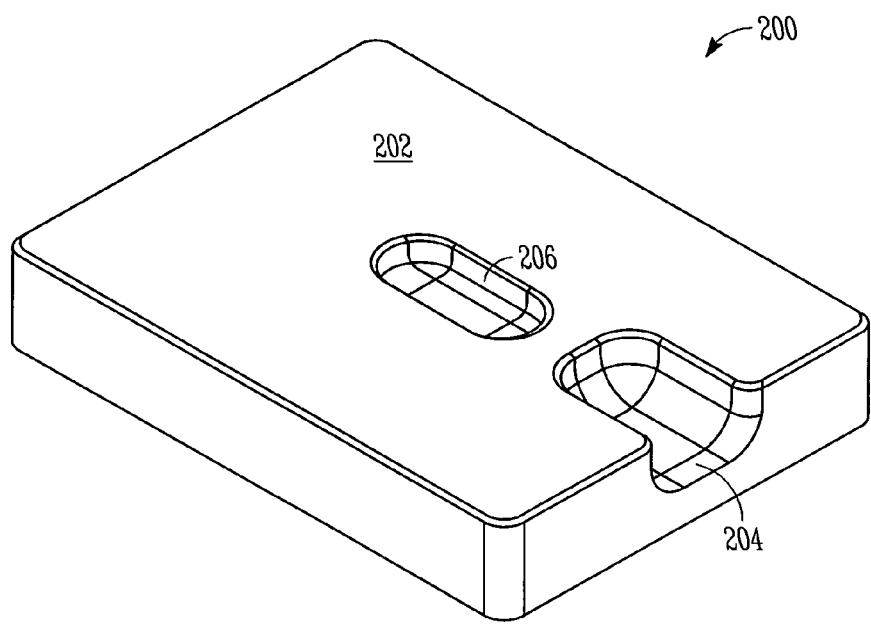
FIG. 2 illustrates a perspective view of a fuel storage component having structural features arranged to conform to a plurality of electronic components of a portable electronic device, according to some embodiments.
Figure 3:
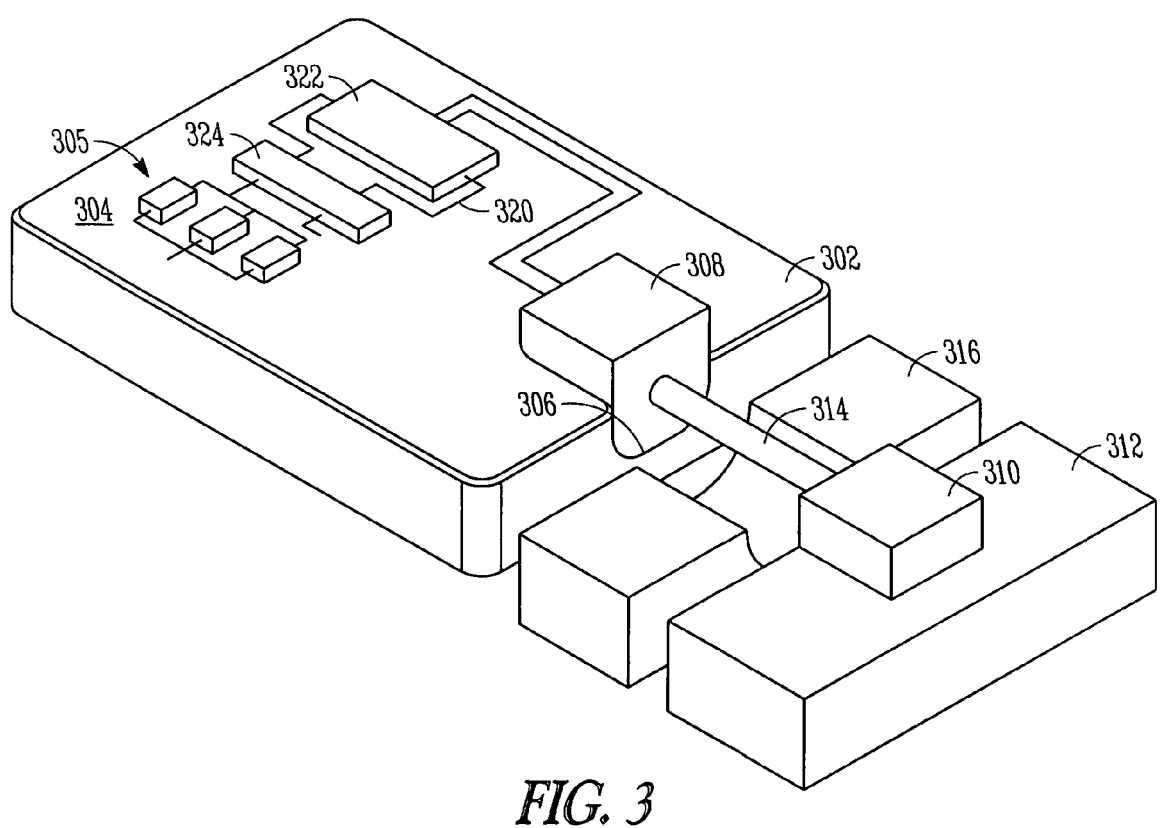
FIG. 3 illustrates a perspective view of a fuel storage component supporting a plurality of schematically illustrated components, according to some embodiments.
Figure 4:
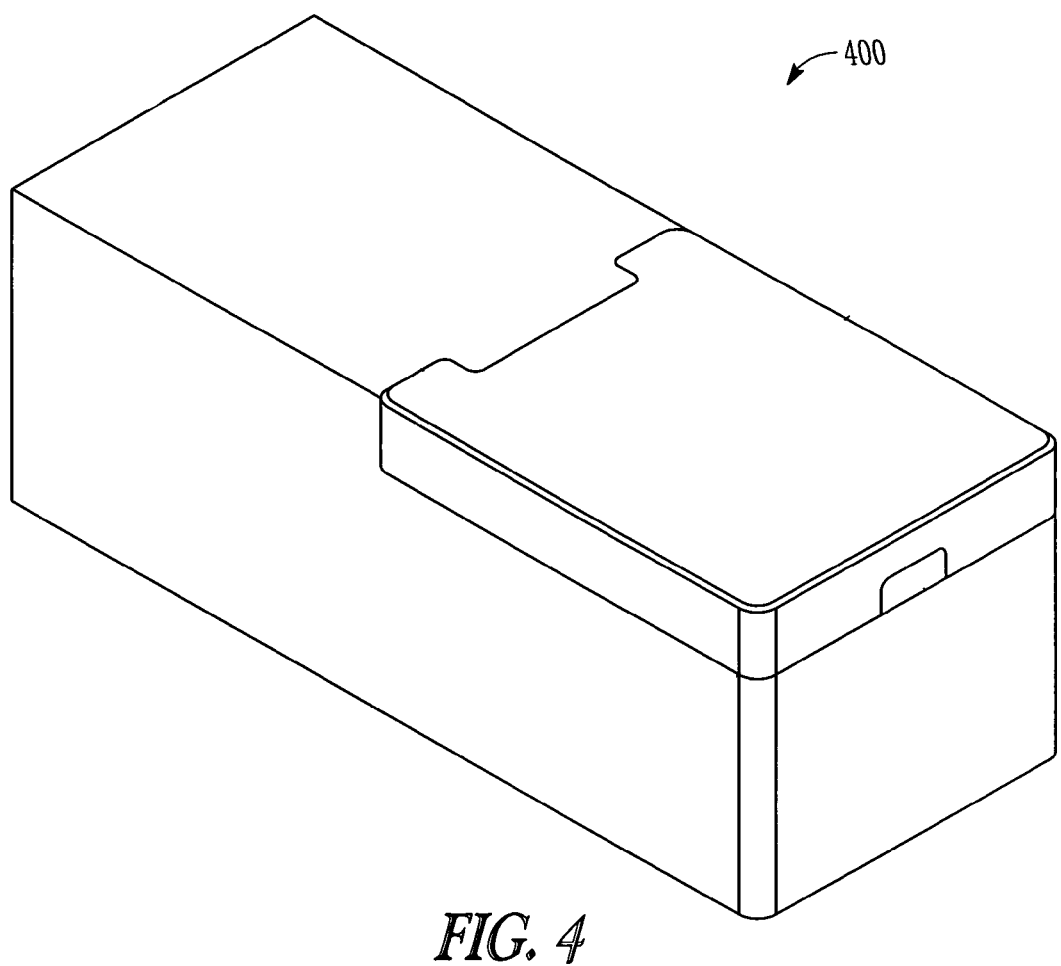
FIG. 4 illustrates a perspective view of a fluid enclosure conforming to a housing of a portable electronic device 400, according to some embodiments.

FIGS. 2-4 illustrate embodiments of energy storage components conforming to a portion of a portable electronic device. The energy storage components in the embodiments shown in FIG. 2-4 demonstrate a variety of ways that an energy storage component may be integrated with a portable electronic device to minimize wasted space by performing two or more functions. Specifically, the energy storage components described below replace portions of the portable electronic device that solely provide a single function or no function. The energy storage component of FIG. 2 replaces wasted space within the application device. The energy storage component of FIG. 3 functions as a circuit board and overall device chassis for the fuel cells and fluid delivery system for the fuel cells. The energy storage component of FIG. 4 replaces a portion of the device housing to protect the internal components of the portable electronic device.

Referring to FIG. 2, a perspective view of an energy storage component having structural features arranged to conform to a plurality of components of a portable electronic device is shown, according to some embodiments. In one embodiment, energy storage component 200 includes structural features for conforming to an existing structure of the portable electronic device 100, such as electronic components on a circuit board, structural features of the device housing, components and features of a fuel cell system, etc. For example, energy storage component 200 includes an outer enclosure surface 202 defining a first concave feature 204 and a second concave feature 206. The concave features may be arranged to conform to existing surfaces and structures within the portable electronic device, such as component architecture on a planar circuit board. As such, the concave features, 204, 206 of the energy storage device 200 may be aligned with electronic components of a circuit board so as to reduce wasted space between the components of the circuit board. In this way, the energy storage component 200 may be designed to accommodate the features of existing structures in portable electronic devices. Alternately, a portion of a portable electronic device or the entire portable electronic device may be supported on an energy storage component.

Referring to FIG. 3, a perspective view of an energy storage component supporting a plurality of schematically illustrated components is shown, according to some embodiments. Energy storage component 302 may include an outer enclosure surface 304 that supports one or more electronic components 305 that are in electrical communication. Examples of electronic components include resistors, capacitors, integrated circuits, diodes, light emitting diodes, connectors, display components etc. Outer enclosure surface 304 of the energy storage component 302 may include electrically conductive traces 320 that provide a pathway for an electric current between the components. In this way, energy storage component 302 functions to support an electrical network within a portable electronic device thereby reducing or eliminating the need for a circuit board. Furthermore, other components, such as components of a fuel cell system, may also be supported or partially supported on or by the energy storage component 302. The electronic components 305 may receive power from the fuel cell system, which may also be supported along the outer enclosure surface 304. For example, fuel cell array 322 may supply power to the electric components 305 of the portable electronic device. The fuel cell array 322 may receive fuel from a fluid enclosure. As such, the energy storage component 302 may include a fluid enclosure.

Returning to FIG. 3, the fuel cells 322 may be arranged in fluid communication with a fluidic component 308 and may receive a fuel flow from the energy storage component 302. Energy storage component 302 may also support an electronic/power conditioning system 324 associated with the fuel cells 322.

Furthermore, FIG. 3 shows a perspective view of a plurality of fluid enclosures, according to some embodiments. The energy storage component 302 may exchange fluid with another fluid enclosure 312. Fluidic component 302 may facilitate fluid exchange between energy storage device 302 and fluidic component 310 of fluid enclosure 312 via conduit 314. A plurality of additional fluid enclosures may be fluidly coupled in the same manner. In doing this, a network of fluid enclosures can be arranged around existing structures, such as portable electronic device structure 316, so as to reduce wasted space. Examples of fluidic components include connectors, valves or regulators, or fluidic interfaces, such as strain-relieving interfaces. Strain-relieving interfaces may be utilized between a flexible fluid enclosure and any structural, energy or fluidic components. Any forces exerted on the attached component by movement, expansion or contraction of the fluid enclosure may be absorbed or otherwise mitigated by the strain-relieving interface. Examples of strain-relieving interfaces may be found in commonly-owned U.S. patent application Ser. No. 12/052,829, entitled "INTERFACE FOR FLEXIBLE FLUID ENCLOSURES," filed Mar. 21, 2008, whose disclosure is incorporated by reference herein in its entirety. Structural features may be included on the outer enclosure surface 304 for supporting the components. For example, concave feature 306 may support fluidic component 308 on the outer enclosure surface 304.

In an example, a small portable battery charger was made using a structural hydride as the primary structural frame onto which other components where attached. A largely rectangular block of composite metal hydride was formed with two protrusions at one end and an indent cavity at the other end. The protrusions and cavity allow components that would otherwise need to be mounted outboard of the fuel store to be integrated into the overall rectangular form factor of the fuel store. Significant volume savings are achieved by doing this since the components to be mounted are of an irregular shape. Between the protrusions a small electronic circuit is installed using a bonding adhesive. Within the cavity a small pressure regulator/filling port apparatus is inserted to allow the fuel store to be filled with hydrogen and to regulate the flow of hydrogen out of the tank when the device is in operation. The pressure regulator assembly is attached to the fuel store by a small metal tube that inserts directly into an aperture formed in the fuel store that is sealed with an o-ring. A thin film hydrogen fuel cell is placed on the top surface of the fuel store, in direct thermal communication so that fuel store is able to absorb heat generated by the fuel cell. In operation, the fuel cell is slightly pressurized, so an overall cover is placed over the entire assembly and fixed around the fuel store to prevent excessive ballooning of the fuel cell and therefore preventing rupture during operation. The assembled system relies entirely on the fuel store for its structural integrity, involves components mounted to the fuel store, requires the fuel store to have been formed with features to allow component placement and mounting and provides a secondary function of internal cooling.

Figure 5:
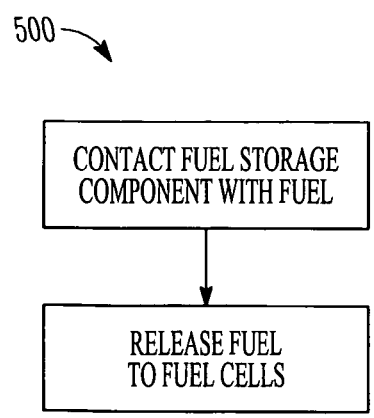
FIG. 5 illustrates a block flow diagram of a method of using a fuel storage component, according to some embodiments.

Referring to FIG. 5, a block flow diagram 500 of a method of using a fuel storage component is shown, according to some embodiments. One or more fuel storage components may be contacted 502 with a fuel. The fuel may be released 504 to one or more fuel cells that are in contact with at least one of the one or more fuel storage components. The one or more fuel storage components are adapted to provide a secondary function, in addition to contacting and releasing a fuel. The fuel may be hydrogen, for example. The secondary function may include structural support, thermal support, electro-magnetic support of some combination thereof.

The above description is intended to be illustrative, and not restrictive. For example, the above-described examples (or one or more features thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. In addition, while the majority of this patent document discusses fuel or reactant based fluid applications, the present systems and methods can be used for other fluid transfer applications in ways similar to those discussed herein. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A portable electronic device comprising a fuel cell system, wherein the fuel cell system comprises:
   at least one fuel storage component, adapted to store and deliver a fuel;
   one or more electronic components; and
   one or more fuel cells, in contact with the at least one of the fuel storage component and the one or more electronic components;
   wherein the at least one fuel storage component forms at least a part of a chassis of the portable electronic device, wherein the chassis comprises a structural framework of the portable electronic device that at least partially encloses the one or more electronic components or that has an outer surface contacting and supporting the one or more electronic components.

2. The portable electronic device of claim 1, further comprising one or more power generating components.

3. The portable electronic device of claim 1, wherein the at least one fuel storage compartment of the chassis comprises at least a portion of one or more of a case, cover, frame, housing or enclosure.

4. The portable electronic device of claim 1, wherein the at least one fuel storage component is dissipating heat, directing heat, absorbing heat, recycling heat or reflecting heat.

5. The portable electronic device of claim 1, wherein the at least one fuel storage component is conducting a current, insulating a current, generating a magnetic field, or directing a magnetic field.

6. The portable electronic device of claim 1, wherein one or more electronic components comprises one or more of circuits, circuit boards, capacitors, integrated circuits, diodes, light emitting diodes, connectors, display components, inductors, displays, display backlights, processor, applications processor, power amplifier, wireless transceiver, linear regulators, switching power converters, graphics processors, baseband processors, processor memory, communications processors, magnetic storage, GPS receiver, microcontroller, or combinations thereof.

7. The portable electronic device of claim 2, wherein the one or more power generating components comprises an auxiliary fuel cell, battery or combination thereof.

8. The portable electronic device of claim 1, wherein the at least one fuel storage component comprises a plurality of fuel stores in fluidic communication so as to define one or more cavities.

9. The portable electronic device of claim 1, wherein at least one surface of the at least one fuel storage component is non-planar.

10. The portable electronic device of claim 1, wherein the at least one fuel storage component comprises a hydrogen-storing material.

11. The portable electronic device of claim 1, wherein the at least one fuel storage component comprises a composite hydrogen storage material.

12. The portable electronic device of claim 1, wherein the at least one fuel storage component comprises a flexible fluid enclosure.

13. The portable electronic device of claim 1, further comprising a strain-relieving interface, wherein the strain-relieving interface is in contact with the at least one fuel storage component.

14. A portable electronic device comprising a fuel cell system, wherein the fuel cell system comprises:
   at least one hydrogen storage material that occludes and desorbs hydrogen, adapted to store and deliver a hydrogen fuel;
   at least one electronic component; and
   at least one fuel cell, in contact with the at least one hydrogen storage material and the at least one electronic component;
   wherein the at least one hydrogen storage material defines a cavity, hole or other feature that at least partially encloses the at least one electronic component, and wherein a complaint grommet is positioned between the cavity, hole, or other feature and the at least one electronic component.

15. A portable electronic device comprising a fuel cell system, wherein the fuel cell system comprises:

at least one hydrogen storage material that occludes and desorbs hydrogen, adapted to store and deliver a hydrogen fuel;

at least one electronic component; and at least one fuel cell, in contact with the at least one hydrogen storage material and the at least one electronic component;

wherein the at least one hydrogen storage material comprises at least one protrusion or at least one recess to provide mechanical engagement between the at least one hydrogen storage material and the at least one electronic component, and wherein a compliant grommet is positioned between the at least one protrusion or at least one recess and the at least one electronic component.

16. A portable electronic device comprising a fuel cell system, wherein the fuel cell system comprises:

at least one hydrogen storage material that occludes and desorbs hydrogen, adapted to store and deliver a hydrogen fuel, wherein the at least one hydrogen storage material comprises a structural feature;

at least one electronic component; and at least one fuel cell, in contact with the at least one hydrogen storage material and the at least one electronic component;

wherein the structural feature comprises one or more of a convex protrusion, concave recess, mounting, flange, fitting, boss, smoothed corner or radiused corner, and the structural feature at least partially encloses the at least one electronic component, and wherein a compliant grommet is positioned between the structural feature and the at least one electronic component.

17. The portable electronic device of claim 16, wherein said structural feature provides an interaction between the at least one hydrogen storage material and the at least one electronic component.

18. A portable electronic device comprising a fuel cell system, wherein the fuel cell system comprises:

at least one hydrogen storage material that occludes and desorbs hydrogen, adapted to store and deliver a hydrogen fuel;

at least one electronic component; and one or more fuel cells, in contact with the at least one hydrogen storage material and the at least one electronic component wherein a surface of the at least one hydrogen storage material comprises a circuit board electrically supporting the at least one electronic component, and wherein a compliant grommet is positioned between said surface and the at least one electronic component.

* * * * *